United States Patent [19]

Adell

[11] Patent Number: 4,817,335

[45] Date of Patent: Apr. 4, 1989

[54] DECORATIVE CLEAR PLASTIC EDGE GUARD

[76] Inventor: Robert Adell, 200 Adell Blvd., Sunnyvale, Tex. 75182

[21] Appl. No.: 76,366

[22] Filed: Jul. 22, 1987

[51] Int. Cl.⁴ .................................................. B60J 5/00
[52] U.S. Cl. ......................................... 49/462; 52/716
[58] Field of Search .......................... 49/462; 52/76–78

[56] References Cited

U.S. PATENT DOCUMENTS

| | | | |
|---|---|---|---|
| 3,494,075 | 2/1970 | Kunevicius | 49/462 |
| 3,547,515 | 12/1970 | Shanok et al. | 49/462 X |
| 3,547,516 | 12/1970 | Shanok et al. | 49/462 X |
| 3,641,707 | 2/1972 | Kellos | 49/462 |
| 3,667,163 | 6/1972 | Bjorum et al. | 49/462 |

*Primary Examiner*—Philip C. Kannan
*Attorney, Agent, or Firm*—Rhodes and Boller

[57] ABSTRACT

A non-metallic edge guard for fitting onto the trailing edge of a door comprises a clear transparent plastic body which has a base covering the end of the trailing edge and legs which are disposed against sides of the trailing edge. Adhesive acts between the interior of the plastic body and the edge for adhering the edge guard to the edge. The preferred adhesive is a double backed adhesive tape. The adhesive, however, is selectively applied so that one of the legs is completely adhesive free. The underlying surface of the edge can be seen through this one leg. When this one leg forms the outer leg of a door edge guard, it enables the painted door color to be presented along the trailing edge while the edge guard still provides protection for that trailing edge. In another embodiment of the invention, the other leg is covered by a decorative insert which presents a different visual effect from that which is presented by the adhesive-free leg. This insert can be a black plastic or a metal foil which is encapsulated in clear mylar. The insert-containing embodiments can be reversed on the door edge, if desird, so that for the black insert embodiment, an exterior "black-out" effect is presented by reversal and for the mylar encapsulated foil embodiment, a metallic effect can be presented by reversal.

11 Claims, 3 Drawing Sheets

DECORATIVE CLEAR PLASTIC EDGE GUARD

REFERENCE TO A RELATED APPLICATION

This application is related to the applicant's pending application Ser. No. 004,658, filed Jan. 20, 1987, "Non-Metallic Door Edge Guard".

BACKGROUND AND SUMMARY OF THE INVENTION

This mechanical invention relates generally to edge guards, and more particularly it relates to novel non-metallic edge guards, for use such as on the trailing edge of swinging closures, and their attachment to such swinging closures.

Edge guards are used as protective and decorative articles on the edges of objects. In the case of a swinging closure of an automotive vehicle such as an automobile door, an edge guard which is applied to the trailing edge of the swinging closure can provide not only decoration, but also protection when the trailing edge is swung against an object. The edge guard can provide protection not only for the trailing edge of the swinging closure, but also for an object which may be struck by the trailing edge of the swinging closure. That is not to say that an edge guard can protect and withstand substantial impacts, but edge guards are useful in preventing chipping, knicking, scratching and like damage which typically arises in regular everyday use of an automobile, for example the opening and closing of a car's doors in a confined space such as in a crowded parking lot.

Applicant is the inventor of many edge guard improvements over the years. These improvements are the subjects of many patents. For the most part, these patented improvements relate to metallic edge guards, or insulated metallic edge guards. Metal possesses superior decorative and functional characteristics, and the insulated metallic edge guards advantageously combine the benefits of metallic and non-metallic components.

Although Applicant continues to prefer the insulated metallic type of edge guard for automotive use because of the combination of benefits which it provides, he has discovered novel ways to improve upon non-metallic edge guards which can be useful for certain applications. Certain of these improvements in non-metallic edge guards are the subject of this patent application.

Non-metallic edge guards are not broadly new. Examples exist in prior patents such as U.S. Pat. Nos. 3,547,516 and 4,372,083. While these prior non-metallic edge guards claim to possess certain beneficial characteristics the truth of the matter is that in practice they are difficult to install, especially on contoured edges, and once installed, they may not retain satisfactorily over the life of the automobile.

Examples of other non-metallic edge guards are illustrated in several of the applicant's pending applications filed subsequently to the related application referenced above.

Briefly, the edge guard of this invention, in its preferred embodiment, comprises a plastic body fabricated by conventional techniques, such as extrusion, so as to possess a shape for fitting onto an edge which it is to cover. The plastic body is fabricated in its entirety from clear transparent material. The cross sectional shape to which the body is extruded may be any conventional one commonly used for edge guards, such as L, V, U, J, or C shapes. As such, the cross section may be considered to comprise a base, which covers the end of the edge, and legs which extend from the base and are disposed against opposite sides of the edge.

An adhesive means is disposed in a particular pattern between the interior of the plastic body and the edge to attach the plastic body to the edge. The adhesive pattern extends on only one leg and an adjoining portion of the base such that the other leg remains free of any adhesive. The preferred type of adhesive is a double-backed tape layer, one surface of which is adhered to the plastic body of the edge guard in accordance with the pattern and the other surface of which remains covered by a strippable release paper until the time the edge guard is to be installed on an edge. It that time the release paper is stripped away to expose adhesive via which the edge guard is attached to the edge. The installation procedure may be performed in a manner such as described in connection with my earlier application, Ser. No. 066,858, filed June 25, 1987.

Although the present invention excludes the presence of adhesive along one of the two legs of the edge guard, the extruding of the edge guard body to appropriate cross sectional shape and appropriate choice of material result in that one leg being properly disposed against the underlying side of the edge without the use of adhesive between it and the edge.

In one embodiment of the invention, the leg which lacks adhesive is disposed to cover an exterior colored surface of the trailing edge of an automobile door whereby the installed edge guard allows the colored surface to show through the clear transparent plastic so that the effect of the installation is that the same colored appearance of the door is presented along the trailing edge, yet protection is obtained in the manner of other door edge guards. The presence of the adhesive attaching means is concealed from view to an outside observer when the door is closed.

In another embodiment of the invention, a decorative insert is applied to the exterior surface of the leg which contains the adhesive. This embodiment is installed in reverse manner from the first embodiment such that the inner leg becomes the outer leg, and vice versa. This results in the presentation of a different exterior appearance effect. By making the insert a black plastic, this leg, and any continguous portion of the base also covered thereby, present what is commonly referred to as a "black-out" effect. By making the insert a mylar-encapsulated metallic foil, the decorative appearance is that of a metallic edge guard. With the insert-covered leg disposed on the exterior of the automobile, the underlying adhesive will be covered by the insert so that it is therefore not visible. The clear plastic leg, which is free of adhesive, and is not visible from the exterior when the door is closed, will bear against the side of the edge so has full edge protection is accomplished.

The foregoing features, advantages, and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

BRIEF THE DRAWINGS

DESCRIPTION OF THE PREFERRED EMBODIMENT

Figure 1A:
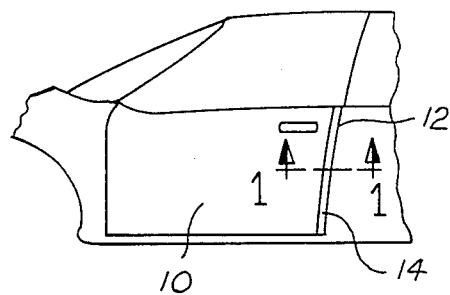
FIG. 1A is a fragmentary side elevational view of an automobile door containing a door edge guard according to the invention.
Figure 1:
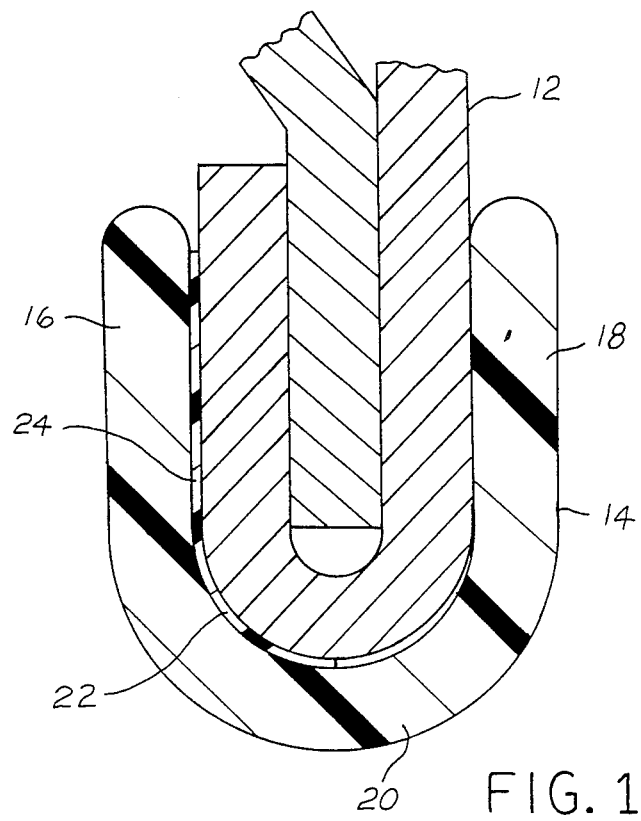
FIG. 1 is a transverse cross sectional view on an enlarged scale taken in the direction of arrows 1—1 in FIG. 1A.

FIGS. 1 and 1A show an automobile door 10 on whose trailing edge 12 is installed a door edge guard 14 in accordance with principles of the invention. The illustrated embodiment of edge guard comprises a general U-shape in transverse cross section having inner and outer legs 16, 18 disposed against opposite sides of the edge, and a curved base 20 which wraps around the end of the edge. It is to be appreciated that the illustrated U-shape is merely representative. Other shapes such as L, V, C, J-shapes are contemplated.

In accordance with principles of the invention, the inner and outer legs 16, 18, and the curved base 20, form a unitary plastic body which is of any suitable clear transparent plastic material. The physical characteristics of the material are such that it is adapted to conform to the edge on which it is disposed. In this regard the edge guard could be either a pliable, non-resilient material which would take a set, or a material which has a certain resiliency. In the latter case, the plastic material is extruded to a shape corresponding substantially to its installed shape but with a slightly more closed configuration so that when it is slightly spread apart for fitting onto the edge, he inherent resiliency of the material will tend to urge it toward a closed condition so that the legs are against the sides of the edge.

For retention purposes in accordance with this invention, the edge guard includes an adhesive means 22. In accordance with particular principles of the invention, this adhesive means is applied to the interior of the U-shaped cross section to extend over at least a portion of one leg, the inner leg 16 in the illustrated example, and also preferably, but optionally, over an adjoining portion, one-half specifically, of the base 20 as well. The other leg, outer leg 18, is entirely free of any adhesive as is the immediately contiguous half of base 20.

The adhesive means 22 which is utilized in the embodiment shown in the drawings comprises a double-backed adhesive tape 24. The double-backed adhesive tape comprises a thin body 26, of foam or fabric for example, containing adhesive on opposite faces 28, 30. One face 28 adheres to the body of the edge guard while the other face 30 adheres to the underlying surface of the door edge.

Figure 2:
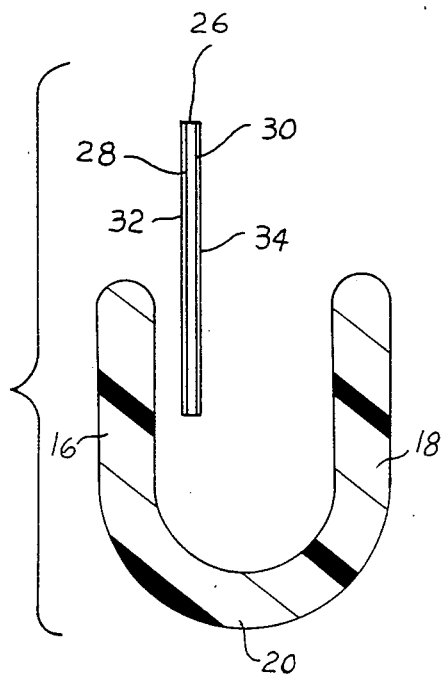
FIG. 2 is an exploded transverse view illustrating a step in the fabrication of the edge guard.
Figure 3:
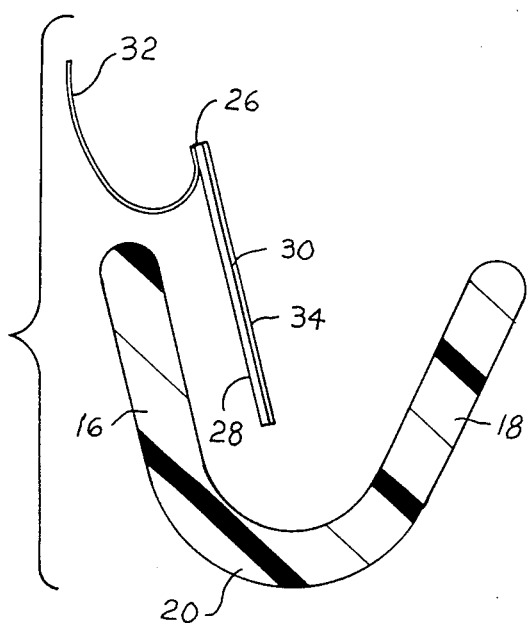
FIG. 3 is a transverse view illustrating a further step in the fabrication process.
Figure 4:
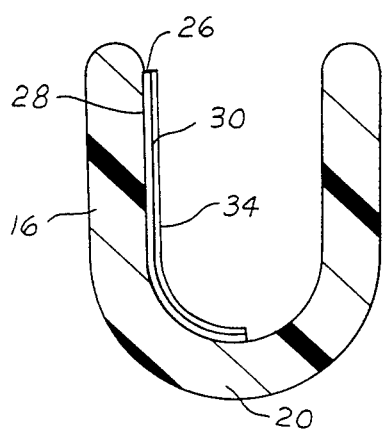
FIG. 4 is a transverse view illustrating the finished edge guard but before installation on a door edge.

FIGS. 2, 3 and 4 illustrate greater detail of the process by which the edge guard is constructed. The double-backed adhesive tape 24 is manufactured with release layers 32, 34 covering the adhesive on the opposite faces 28, 30. The tape preferably extends the full length of the edge guard. The tape's width corresponds generally to the combined lengths (as viewed in FIG. 1 of those portions of the inner leg and immediately adjoining portion of the base to be adhered to the door edge. One of the two release layers is stripped away, and the edge guard is spread sufficiently open to allow the one exposed face of the tape to be adhered to the inner leg and the adjoining portion of the base. The finished condition is like that portrayed in FIG. 4.

Figure 5:
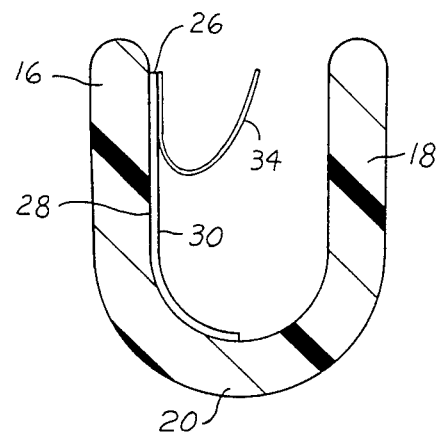
FIG. 5 is a transverse view illustrating a step in the process of installing the edge guard on the door edge.

The edge guard is preferably manufactured and sold in the condition represented by FIG. 4 so that it is ready for installation on a door edge simply by stripping away the remaining release layer as shown in FIG. 5. With this remaining release layer having been stripped away, the edge guard ma be spread open sufficiently to allow the inner leg and the adjoining portion of the base to be adhered to the corresponding underlying surface of the door edge as portrayed in FIG. 1. The characteristic of the material of the body of the edge guard will cause the base to wrap around the end of the trailing edge and the outer leg to be disposed against the outside surface of the edge.

Since it is the outside surface of the door which is exposed to view when the door is closed, it will therefore be the outer leg 18 and the immediately contiguous portion of the base which will be visible as well. The typical automobile door is painted to a desired exterior color and therefore the clear transparent nature of the edge guard material, free of any attachment or adhesive means, will allow the underlying color of the door to show through along the trailing edge of the door. In other words, the effect of the edge guard is as if the edge guard itself were the exact same color of the painted door so that the edge guard itself will be imperceptible to a casual observer. Yet, the edge guard possesses the protective attribute of guarding against chipping of paint from the door edge such as when the door is swung open against an object in the path of travel of the door edge. The presence of adhesive along substantially the entire interior of the inner leg and an adjoining portion of the base provides very satisfactory attachment. Although principles of the invention are not limited to specific dimensions, a typical thickness for the legs may be 0.060 inch. Although the embodiment of FIGS. 1 through 5 permits the adhesive means to be seen through the transparent inner leg and adjoining portion of the curved base, his is not objectionable since they will not be seen when the door is closed.

A desire for color coordination is not universally sought in door edge guards. Some door edge guards are preferred to present a metallic appearance such as chrome while others are desired to provide what is commonly referred to as a black-out function. These attributes can be advantageously embodied in a door edge guard according to the invention. This is done by applying an insert or layer in covering relationship to the adhesive-containing leg and any adjoining portion of the curved base where the adhesive is present.

Figure 6:
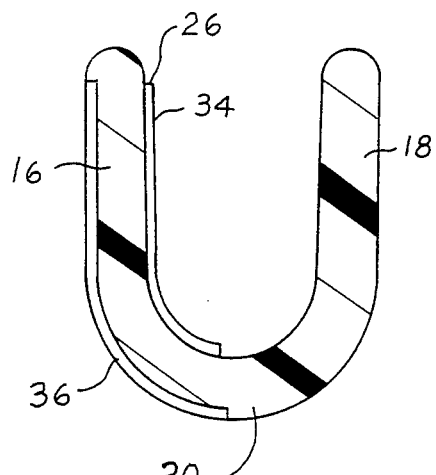
FIG. 6 is a transverse view of another embodiment of edge guard.

A first example is shown in FIG. 6 where an insert 36 is a layer of black plastic material. If it were desired to present the painted color of the door as the exterior appearance, then this embodiment would be installed in the same manner as that of FIGS. 1 through 5. However, if it is desired to present a black-out appearance, the edge guard's installation is reversed so that the inner leg becomes the outer leg and the outer leg becomes the inner leg. The fact that adhesive will now be present between the outer leg and the exterior surface of the door is of no consequence because it is concealed by the black-out layer.

Figure 7:
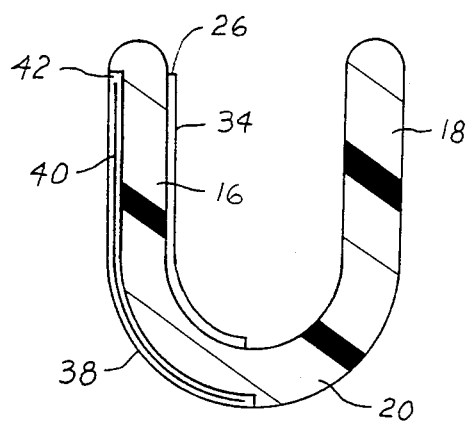
FIG. 7 is a transverse view of still another embodiment of edge guard.

Similarly, FIG. 7 illustrates an embodiment in which the insert 38 is a metallic foil 40 which is encapsulated in clear mylar plastic 42. This embodiment of FIG. 7 permits the painted color of the door to be presented when installed on the edge in the manner of FIGS. 1 through 5. However, if it is desired to present a metallic appearance, the edge guard is reversed so that the mylar-encapsulated foil is presented along the exterior of the door. Once again, the fact that adhesive is now applied to the outer surface of the door is of no consequence because of the concealing effect of the encapsulated foil insert covering the adhesive.

Figure 8:
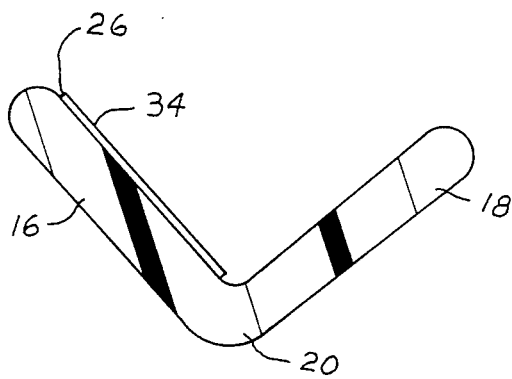
FIG. 8 is a transverse view of yet a further embodiment of edge guard.

FIG. 8 illustrates yet another embodiment of edge guard which is like the embodiment of FIGS. 1 and 5 so that like reference numerals designate like parts. The only difference is that the embodiment of FIG. 8 has a V-shape as distinguished from the U-shape of FIGS. 1-5. Hence, the embodiment of FIG. 8 is adapted for fitting onto a corner edge such as in the manner of the door corner edge guard described in applicant's U.S. Pat. No. 4,674,233 issued June 23, 1987.

The invention offers number of possibilities from the standpoints of manufacturing and installation. As explained above, the preferred manufacture comprises adhering the double-backed adhesive tape to the edge guard body at the factory. This could be done in association with an extrusion line at which the plastic body is extruded. As the plastic body travels from the extruder and after having been processed through appropriate post-extrusion procedures, the adhesive tape can be introduced into the channel-shaped extruded plastic on the fly, one of the release layers having been stripped away from the one face of the tape to expose the adhesive for adhesion to the plastic. Suitable rolls and guides may be employed so that the tape is securely adhered to the plastic body of the edge guard in the desired location. The finished product as it leaves the extrusion line will comprise the clear plastic body with adhesive tape covered by the outer release layer for subsequent stripping at time of installation on an edge. The product may be cut to length or may be coiled into rolls as desired. The nature of the plastic material which forms the body is such that the edge guard can be conformed to curvatures and sweeps such as are present in the trailing edges of automobile doors.

Alternatively the step of applying the adhesive tape to the edge guard at the factory can be omitted and a separate gluing operation conducted at the time of installation. Such a gluing operation may involve double-backed tape or another type of adhesive means. Certain commercially available glues are thought to have an ability to actually chemically react with a painted door edge and obtain excellent adhesion.

In general, it is preferred that the thickness of the leg which contains no adhesive be just thick enough to provide adequate protection to avoid too great a thickness which might create undesired optical effects. Hence, although a particular example has been given above for a representative thickness, i.e. 0.060 inch, it is to be appreciated that this is merely representative. Likewise, it is deemed most convenient for the line of demarcation between the adhesive area and the non-adhesive area to be exactly at the center of the base. While this is conceivably more important for those embodiments such as FIGS. 6 and 7 which can be reversed it is to be appreciated that there may be variations in exactly where the line of demarcation will exist in any particular edge guard.

While a preferred embodiment of the invention has been disclosed, it is to be appreciated that principles are applicable to other embodiments.

What is claimed is:

1. In combination with the colored trailing edge of a swinging closure, such as an automobile door, an edge guard comprising a clear transparent body having a base which fits over the end of the trailing edge and legs which extend from said base and are disposed against opposite sides of the trailing edge, adhesive means disposed to act between the interior of said body and the trailing edge to attach the plastic body to the trailing edge, said adhesive means being selectively disposed on at least a portion of only one leg such that the other leg remains free of any adhesive means and the color of said trailing edge is presented through said other leg free of visual obstruction save for any negligible effect which might be imposed by the clear transparent character of said body, and in which said adhesive means is disposed along substantially all of said only one leg and an adjoining portion of said base.

2. An edge guard as set forth in claim 1 in which said adhesive means covers substantially one-half of said base.

3. An edge guard as set forth in claim 1 in which said adhesive means comprises a double-backed tape.

4. An edge guard as set forth in claim 1 including a decorative insert disposed on the exterior of said one leg in covering relation to said adhesive means.

5. An edge guard as set forth in claim 4 in which said decorative insert comprises a black opaque layer.

6. An edge guard as set forth in claim 4 in which said insert comprises a metallic foil encapsulated in clear plastic.

7. An edge guard as set forth in claim 1 in which said trailing edge has an exterior surface which is exposed to view when the swinging closure is in closed position and an interior surface which is concealed from exterior view when the swinging closure is in closed position and wherein said other leg is disposed against said exterior surface of said trailing edge.

8. An edge guard as set forth in claim 7 including an insert disposed in covering relation on the adhesive-containing leg so that a different visual effect is presented by the latter leg from the visual effect presented by said other leg.

9. In combination with the colored trailing edge of a swinging closure, such as an automobile door, an edge guard comprising a clear transparent body having a base fitting over the end of the trailing edge and legs which extend from said base and are disposed against opposite sides of the trailing edge, a decorative insert co-acting with one of said legs to cause that leg to present a different visual appearance from the visual appearance presented by the other leg, and adhesive means acting to adhere between said one leg and said edge, but not between said other leg and said edge such that the color of said trailing edge is presented through said other leg free of visual obstruction save for any negligible effect which might be imposed by the clear transparent character of said body.

10. An edge guard as set forth in claim 9 in which said decorative insert comprises a black opaque layer.

11. An edge guard as set forth in claim 9 in which said decorative insert comprises a metallic foil encapsulated in a clear transparent layer.

* * * * *